Patented Nov. 30, 1937

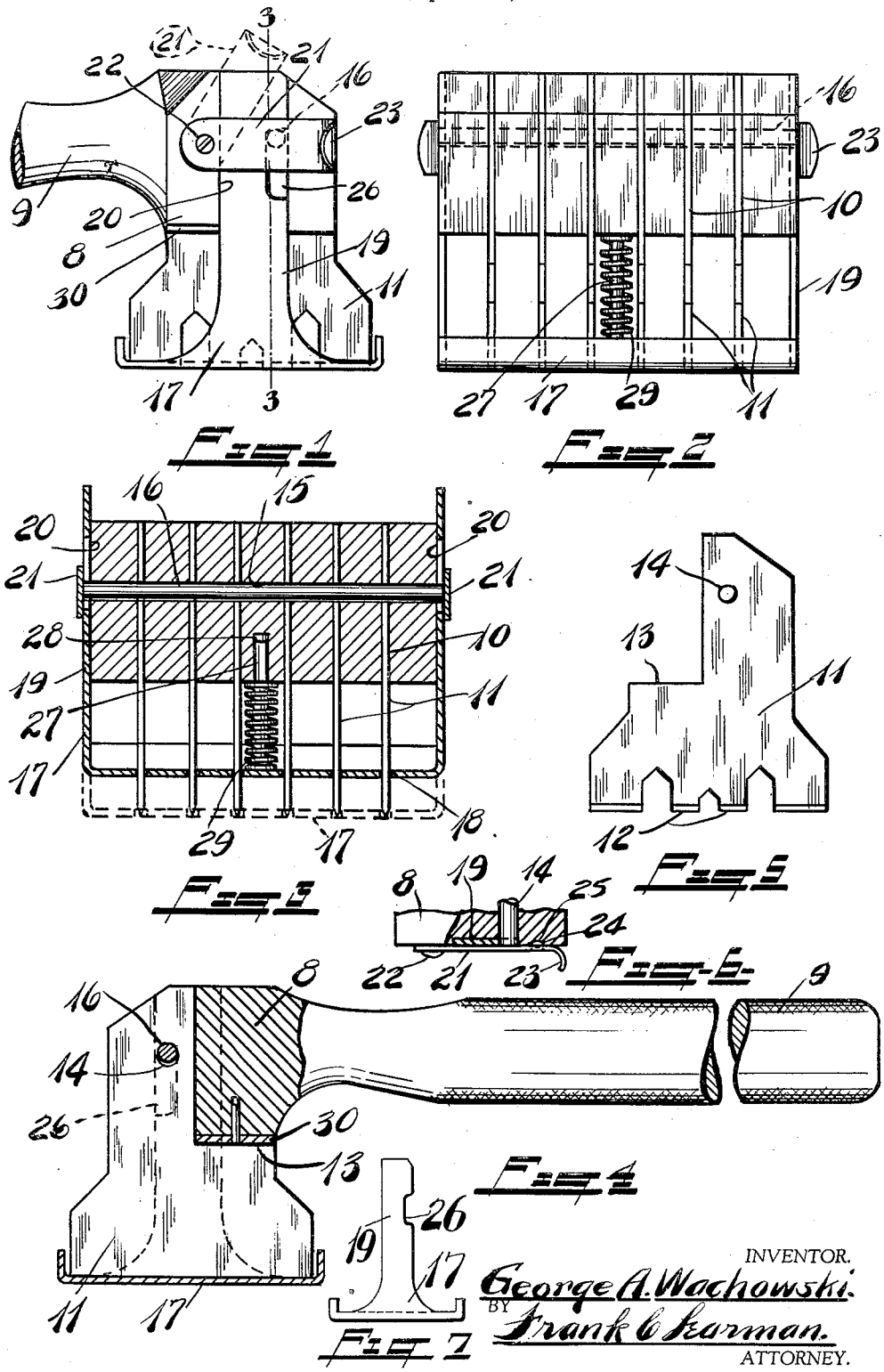

2,100,770

UNITED STATES PATENT OFFICE 2,100,770

STEAK TENDERIZING AND DICING TOOL

George A. Wachowski, Flint, Mich., assignor of one-half to Phillip Koffman, Bay City, Mich.

Application April 26, 1937, Serial No. 139,069

3 Claims. (Cl. 17—30)

This invention relates to a tool for use in meat shops, hotels, restaurants, and homes for the tenderizing, dicing, or otherwise treating of meats and steaks in particular, so that they may be tenderized, diced or knitted together, and so that various kinds and pieces of steaks may be spliced together to form one continuous piece.

One of the prime objects of the invention is to design a very simple, practical and economical tool which is easy to handle and operate, which quickly tenderizes and/or knits pieces of meat together so that they remain knitted after being prepared for consumption, and which can be easily and quickly disassembled and cleaned.

Another object of the invention is to provide a tool having a plurality of spaced apart, loosely mounted blades, so designed and mounted as to permit the easy removal or insertion thereof, and provide a spring actuated stripper for stripping and cleaning the blades as the device is operated.

A further object is to provide a simple tool which is easy to manufacture and assemble, which is composed of comparatively few parts, and which will last for an indefinite period of time.

With the above and other objects in view, the present invention consists in the combination and arrangement of parts, hereinafter more fully described, illustrated in the accompanying drawing, and specifically pointed out in the appended claims, it being understood that changes may be made in the form, size, proportion, and minor details of construction, without departing from the spirit or sacrificing any of the advantages of the invention.

In the drawing:

Fig. 1 is a side elevational view of my steak tenderizing tool with the handle broken away, the broken lines showing the stripper retaining clip swung up to permit removal of the blade retaining pin.

Fig. 2 is a front view thereof.

Fig. 3 is a transverse sectional view taken on the line 3—3 of Fig. 1, the solid lines showing the stripper raised, the broken lines showing it in lowered position.

Fig. 4 is a side elevational view, parts being broken away to show the construction.

Fig. 5 is a detail side elevational view of one of the blades.

Fig. 6 is a fragmentary part sectional plan view of the tool.

Fig. 7 is also a fragmentary side elevational view of the stripper illustrating the slotted section.

Referring now more specifically to the drawing in which I have shown the preferred embodiment of my invention, the numeral 8 indicates a preferably cast holder shaped as clearly shown in Figs. 3 and 4 of the drawing, this is provided with a handle 9 to facilitate manipulation thereof, and spaced apart vertical slots 10 are provided in the head for the accommodation of a plurality of blades 11, and which are formed as clearly shown in Fig. 5, the lower cutting edge of these blades being formed with teeth 12 suitably beveled and sharpened, so that they readily pierce and cut the meat, and the blades are shouldered as at 13 and for a purpose to be presently described.

An opening 14 is provided in the upper section of each blade and registers with the horizontally disposed openings 15 provided in the head, these openings accommodating a pin 16 for securing the blades in position, and I wish to direct particular attention to the fact that the openings 14 are of slightly larger diameter than the pin so that they freely fit thereon.

A stripper 17 is mounted on the head as shown, the face portion being slotted as at 18 to accommodate the blades 11, the end sections being formed with legs 19 which are slidably mounted in grooves 20 provided in the end walls of the head, a flat, slightly bowed resilient strip 21 spanning each leg and groove and is secured in position by means of a screw 22, the opposite end being pivotally curved outwardly as shown at 23, and a raised boss 24 is provided on the clip and engages a depression 25 provided in the head to hold the clip in position. One edge of each clip is cut away as shown at 26 and accommodates the end section of the pin 16 which projects therethrough, said pin limiting the vertical travel of the stripper blade as well as securing the blades in assembled relation.

A central vertically disposed guide pin 27 is provided on the stripper and registers with an opening 28 formed in the head, a spring 29 being interposed between the bottom of the head and the stripper for forcing the stripper outwardly after each stroke.

In practise the operator places the steak or meat on a flat surface, grasps the handle 9 of the tenderer, raises it, much the same as a hammer, and strikes the steak, the impact forcing the stripper 17 upwardly and the blades 11 penetrate the meat. When the tool is raised, the spring 29 forces the stripper plate downwardly, stripping any meat particles from the blades and moving slightly beyond and covering the sharp edge of the teeth, forming a protection and eliminating the possibility of injury to the operator or the dulling of the teeth; this hammering being continued until the steak has been thoroughly tenderized and/or diced.

A wear plate 30 is provided on the lower face of the head and is formed of steel or similar material, the shoulder 13 of the blades bearing against said plate so that wear on the pin 16 is eliminated, this wear plate is further desirable as it permits the head to be cast of light, easily machinable alloy or similar material.

When it is desired to knit several small pieces together or splice a piece of pork with a piece of beef, etc., the one piece is placed in overlapping relation with the other, then by striking the overlapping sections with the tool the pieces can be neatly spliced so as to form a continuous slice. This method enables anyone to splice slices of different kinds or combinations of meat together so that any desired combination can be secured. Suet is also added in the same manner, and any desired design can be worked on the steak by operating the tool to suit the design.

To clean the tool, it is only necessary to swing one of the clips 21 upwardly as shown in broken lines in Fig. 1 of the drawing, remove the pin 16, and the blades and stripper are free for removal so that all parts may be easily and thoroughly cleaned.

I wish to direct particular attention to the fact that the blades 11 are loosely mounted in the head, the opening 15 being of larger diameter than the pin 16, and the slotted stripper plate openings 18 are wider than the blades so that the blades are loosely mounted and do not "hang" in the meat during the tenderizing operation.

From the foregoing description it will be clearly obvious that I have perfected a very simple, practical, and economical meat tenderizing tool for tenderizing, dicing, splicing and/or knitting steaks etc.

What I claim is:

1. A tool of the class described and comprising a head provided with a handle, a wear plate on the lower face thereof, a plurality of blades, loosely and removably mounted in the head and bearing against said plate, a stripper slidably mounted on said head and provided with slots to accommodate the cutting edges of the blades, and a transversely disposed pin removably mounted in said head and extending through said blades for securing them in assembled relation.

2. A tool of the class described and comprising a head provided with a handle, a wear plate secured to the lower face thereof, spaced apart vertical slots in said head, shouldered blades removably mounted therein and bearing against said plate, a transversely disposed pin extending through the head and blades for loosely securing them in position, a stripper slidably mounted in the head and provided with slotted edge sections adapted to accommodate the ends of the pin, and resilient means interposed between the bottom face of the head and the stripper for forcing the stripper outwardly when the tool is operated.

3. A tool of the character described and comprising a head having a handle formed integral therewith, a wear plate secured to the lower face thereof, a plurality of spaced apart vertical slots provided in said head, blades mounted in said slots and formed with a shoulder bearing against said wear plate, a transversely disposed pin extending through said head and blades for loosely securing said blades in position, grooves in the end walls of the head, a stripper mounted on said head and formed with legs slidably mounted in said grooves, slotted edge sections in the stripper legs and adapted to accommodate the end sections of the pin, pivotally mounted resilient clips mounted on the head and engaging the ends of the pin, and resilient means interposed between the stripper and the lower face of the head for forcing the stripper to its extreme extended position.

GEORGE A. WACHOWSKI.